United States Patent [19]

Motooka

[11] Patent Number: 4,762,989

[45] Date of Patent: Aug. 9, 1988

[54] IMAGE DETECTION WITH IMAGE PLANE DIVIDER

[75] Inventor: Wesley D. Motooka, Irvine, Calif.

[73] Assignee: Ford Aerospace & Communications Corporation, Detroit, Mich.

[21] Appl. No.: 880,455

[22] Filed: Jun. 30, 1986

[51] Int. Cl.$^4$ ............................ H01J 3/14; H01J 40/14
[52] U.S. Cl. ....................................... 250/216; 250/578
[58] Field of Search ................ 250/203 R, 201 R, 578, 250/216, 203 S; 244/3.16; 356/121

[56] References Cited

U.S. PATENT DOCUMENTS

| | | | |
|---|---|---|---|
| 3,654,475 | 4/1972 | Montpas | 250/203 R |
| 4,005,285 | 1/1977 | Price | 250/208 |
| 4,044,384 | 8/1977 | Inokuchi | 358/293 |
| 4,053,773 | 10/1977 | Deresh et al. | 250/349 |
| 4,056,720 | 11/1977 | Williams, Jr. et al. | 250/203 R |
| 4,092,531 | 5/1978 | Moss | 250/203 R |
| 4,383,170 | 5/1983 | Takagi et al. | 250/578 |
| 4,399,356 | 8/1983 | Fiernleib et al. | 250/201 |

OTHER PUBLICATIONS

Janeway et al., *IBM Technical Disclosure Bulletin*, vol. 20, No. 1, Jun. 1977, pp. 18–19.

Primary Examiner—David C. Nelms
Assistant Examiner—Michael Messinger
Attorney, Agent, or Firm—Edward J. Radlo; Keith L. Zerschling

[57] ABSTRACT

Apparatus for improving the resolution and/or field of view of an optical system without degrading the signal-to-noise ratio. An optical image of the object (1) in an image plane (8) is divided into n subimages, where n is any positive integer. Each of the n subimages is separately refocused (by 10, 20, 30) and detected (by 11, 21, 31). The optical system can be a staring or a scanning system, and can operate at any wavelength. When the number of subimages is two, an image bisector (7) is used. The bisector (7) comprises first and second highly reflective planar surfaces (12, 22). A knife edge (2), formed by the intersection of the reflective surfaces (12, 22), lies in the image plane (8). In the more general case, n−1 reflective surfaces are used, each having a knife edge lying in the image plane (8).

8 Claims, 2 Drawing Sheets

IMAGE DETECTION WITH IMAGE PLANE DIVIDER

DESCRIPTION

1. Technical Field

This invention pertains to the field of enhancing the resolution and/or field of view of an optical system without degrading the signal-to-noise ratio.

2. Background Art

U.S. Pat. No. 4,005,285 discloses a beam splitter (which divides unfocused optical energy) as opposed to an image plane divider (which divides the optical image). The reference device enhances resolution (FIG. 2) or field of view (FIG. 1), but since it divides unfocused optical energy, the signal-to-noise ratio is degraded as the resolution or field of view is increased. Additionally, the reference device is not well suited for infrared applications, because of background non-uniformity caused by surfaces 20a and 20b.

U.S. Pat. No. 4,044,384 discloses a device for obtaining a wider field of view by alternately sampling two adjacent fields of view. In other words, it is an optical multiplexer which temporally splits the field of view. The signal-to-noise ratio degrades as the field of view increases, because the viewing time decreases. Since the entire field is not viewed at once, the reference device is not appropriate for viewing fast moving objects.

U.S. Pat. No. 4,053,773 discloses a device for obtaining better resolution in a staring optics system. It is a beam splitter (which divides unfocused optical energy), not an image plane divider (which divides the optical image). As a consequence, the signal-to-noise ratio decreases as the resolution improves.

Janeway et al., *IBM Technical Disclosure Bulletin* Vol. 20, No. 1, June 1977, pp. 18-19, discloses a device for obtaining a larger field of view. This device splits the optical energy outside of the image plane, so that the detectors do not each have full access to the entrance aperture. Thus, the signal-to-noise ratio is degraded as the field of view is increased.

DISCLOSURE OF INVENTION

The invention comprises apparatus for improving the resolution and/or field of view of an optical system without degrading the signal-to-noise ratio. It can be used at any frequency, including infrared, and is suitable for viewing moving objects. The invention comprises imaging means (3, 4, 6) for producing an optical image of an object (1) in an image plane (8); dividing means (7) for dividing the optical image into n contiguous subimages, where n is any positive imager; and detecting means (11, 21 31) for electronically converting each of the subimages so generated into an electronic representation.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
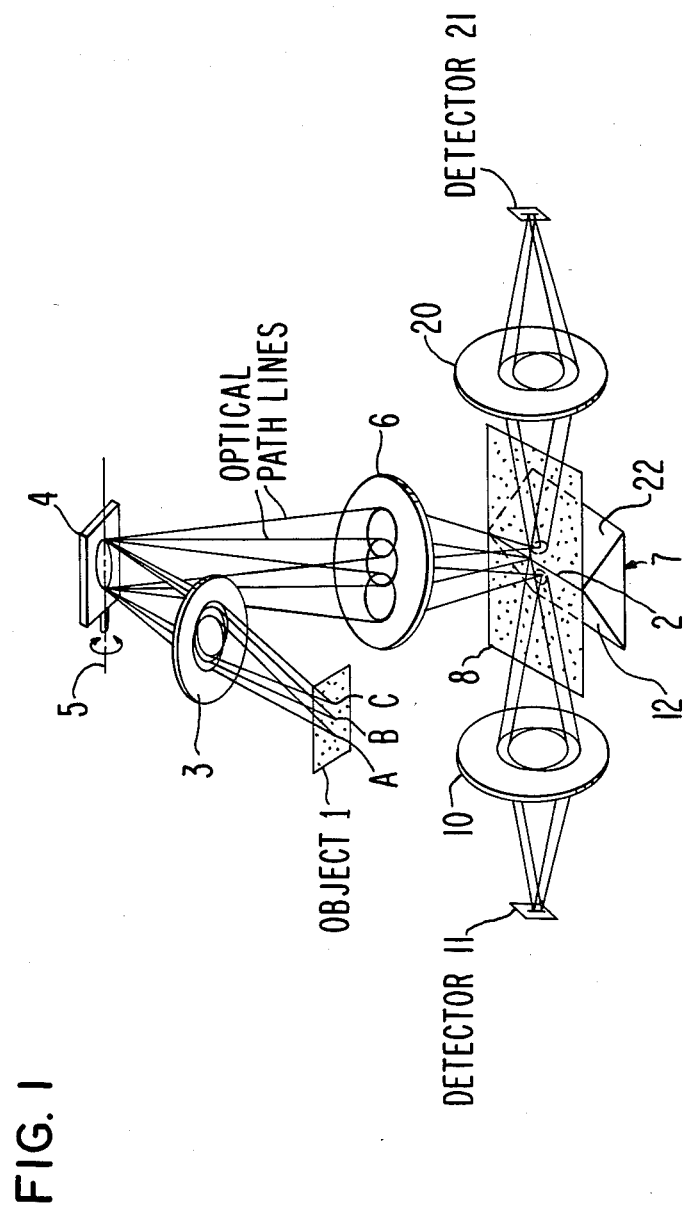
FIG. 1 is an isometric view of an embodiment of the present invention in which the imaging means 3, 4, 6 transfers the image from the plane of object 1 to the image bisector 7 after reflecting off of linear scanning means 4. The linear scanning means 4 scans the image along the knife edge 2 of the image bisector 7, thus producing two subimages. Each of the subimages is reimaged (by lenses 10 and 20) to detector focal plane arrays 11 and 21, which are used to convert the scanned images into electrical representations.

FIG. 1 illustrates an embodiment in which object 1 is scanned in one linear dimension across the image plane 8, and thus across detectors 11, 21. Scanning mirror 4 produces a linear scan by pivoting about mirror axis 5. The invention could just as readily be employed with staring optics, in which case scanning mirror 4 is replaced by a fixed mirror, and each of detectors 11, 21 is, for example, a two-dimensional mosaic focal plane array of photodetective elements.

FIG. 1 illustrates optical path lines emanating from three points A, B, C within object 1. An imaging means, which, for purposes of illustration only, comprises first lens 3, scanning mirror 4, and second lens 6, projects an optical image of object 1 onto an image plane 8. As used herein, an "image plane" is any plane in which optical energy from an object is refocused. Object 1 is shown as lying in a plane which itself could be an image plane (i.e., the actual physical object is elsewhere).

Thus, imaging means 3, 4, 6 refocuses points A, B, C onto image plane 8. An image bisector 7, e.g., a triangular cross section prism, is formed from highly reflective planar surfaces 12, 22 which are contiguous along a linear knife edge 2. Knife edge 2 lies within image plane 8 and is parallel to the scanning direction produced by the rotation of scanning mirror 4.

As illustrated, point B is refocused on knife edge 2. Point A is refocused just to the left of point B. A slightly defocused (because lowered) spot corresponding to point A reflects off surface 12 and is reimaged by reimaging lens 10 onto detector 11, along with photons just to the left of point B. Similarly, point C is refocused on image plane 8 to the right of point B. A slightly defocused (because lowered) spot corresponding to point C reflects off surface 22 and is reimaged by reimaging lens 20 onto detector 21, along with photons just to the right of point B.

Lenses 10 and 20 thus "optically butt" detectors 11, 21 in image plane 8, thereby doubling the effective size of the detector focal plane arrays 11, 21. This overcomes the problem of placing a large number of photodetective elements onto a single detector substrate.

Detectors 11 and 21 are any photodetectors. In the FIG. 1 embodiment, detectors 11, 21 are linear arrays of photodetective elements arranged vertically to accept the scanned images from the left and right portions, respectively, of object 1. In a time delay and integration configuration, detectors 11 and 21 could be several parallel columns of photodetective elements.

If surfaces 12 and 22 form a 90° angle with respect to each other, then image bisector 7, lenses 10 and 20, and detectors 11 and 21 will all lie in the same plane.

If in FIG. 1, the optics are configured so that each detector 11, 21 views only half of object 1, then the resolution doubles compared with the case where a single detector of the 11, 21 variety is made to view object 1. Alternatively, one would obtain a doubled field of view with the same resolution if the imaging means 3, 4, 6 were designed so that the object field is doubled. Increased resolution and field of view can also be simultaneously achieved by choosing an optical design between the two described. In no case is the signal-to-noise ratio degraded.

Figure 2:
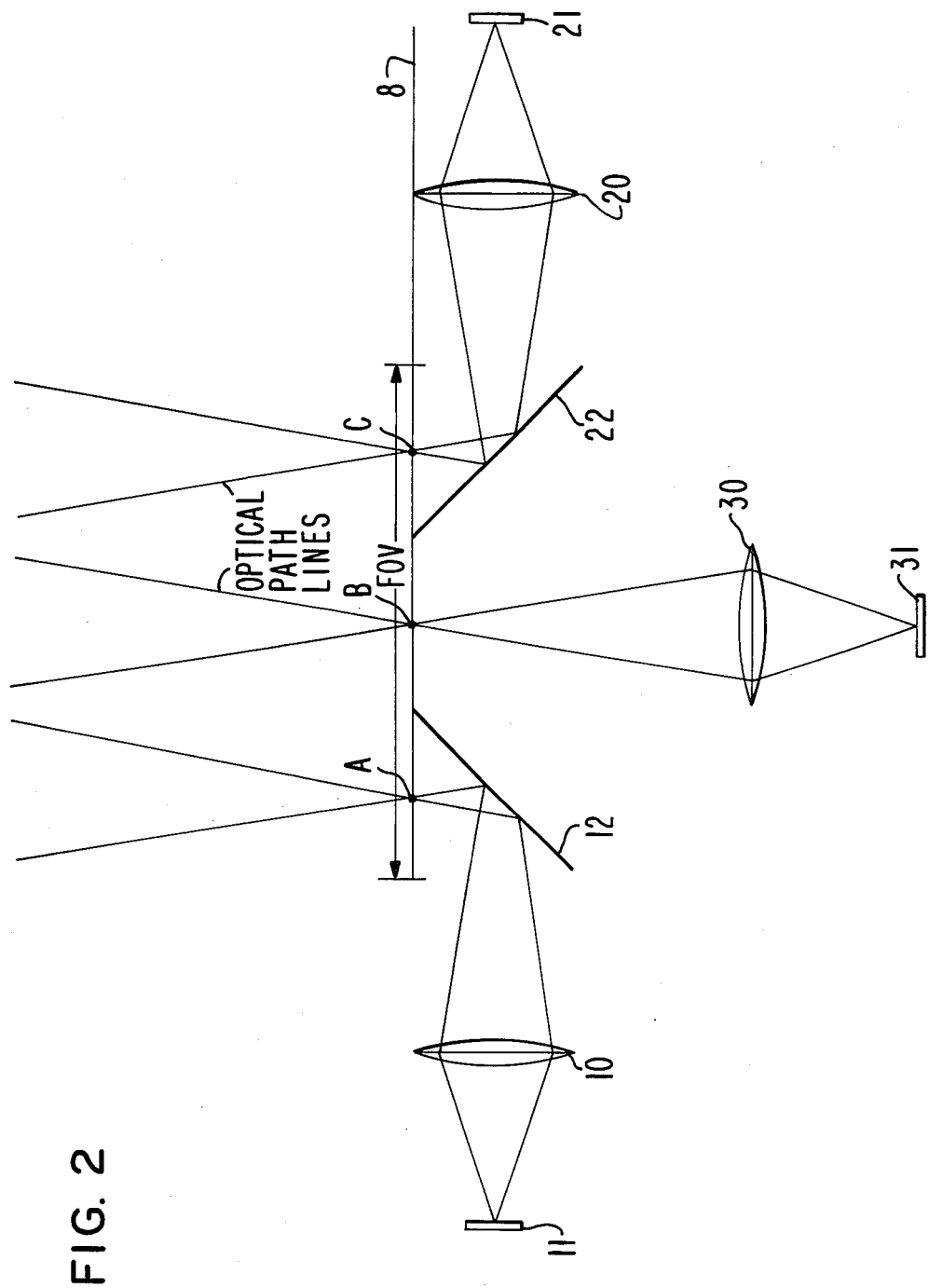
FIG. 2 is a side elevational view of an embodiment of the present invention in which the number of subimages is three.

The techniques of this invention can be used to divide the optical image of object 1 "n" ways, where "n" is any positive integer. FIG. 2 illustrates the case where "n" is equal to 3. Three points A, B, C within object 1 are refocused within a field of view on image plane 8 by an imaging means (not illustrated in FIG. 2). The field of view is trisected by two highly reflective planar surfaces 12 and 22, each of which has a linear knife edge lying in image plane 8 and orthogonal to the plane of FIG. 2. If the imaging system comprises a scanning means, each of the knife edges should be parallel to the scanning direction produced by the scanning means.

Photons from the left third of object 1, including those corresponding to point A, are reflected off first reflective surface 12, and are refocused by lens 10 onto detector 11. Similarly, photons from the right third of object 1, including those associated with point C, reflect off surface 22, and are refocused by lens 20 onto detector 21. Photons from the middle third of object 1, including those associated with point B, pass through image plane 8, and are refocused by lens 30 onto detector 31.

In general, n−1 reflective surfaces, each having a knife edge lying in the image plane, can be used to divide the optical image of object 1 into n subimages, each of which is refocused and detected, thus improving the resolution and/or field of view of the optical system without degrading its signal-to-noise ratio. (In the embodiment of FIG. 1, two reflective surfaces 12, 22 are used to produce two subimages, but said two subimages can just as easily be formed with one knife edge of the type shown in FIG. 2.)

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for generating an electronic image of a resolved object, comprising:
    imaging means for converting the resolved object into a resolved optical image in an image plane;
    dividing means for simultaneously dividing, in the image plane itself, the resolved optical image into n contiguous subimages, where n is a positive integer; and
    detecting means for simultaneously converting each of the subimages into an electronic representation to form a composite electronic image in which at least one of the attributes from the set of attributes comprising resolution and field-of-view is enhanced, with no degradation in the signal-to-noise ratio for a given imaging time and with no loss in any portion of the image of the resolved object, with respect to systems in which said image plane dividing is not employed.

2. The apparatus of claim 1 wherein the imaging means comprises scanning means for scanning the optical image across the image plane in a linear scan direction.

3. The apparatus of claim 2 wherein the dividing means divides the optical image along a line parallel to the scan direction.

4. The apparatus of claim 2 wherein the detecting means comprises, for each subimage, a linear array of photodetective elements.

5. The apparatus of claim 2 wherein the detecting means comprises, for each subimage, an array of several parallel columns of photodetective elements.

6. The apparatus of claim 1 wherein the imaging means comprises an unscanned optics system; and
    the detecting means comprises, for each subimage, a two dimensional array of photodetective elements.

7. The apparatus of claim 1 wherein the number of subimages is two; and
    the dividing means is an image bisector comprising two reflective planar surfaces joined along a linear edge lying in the image plane.

8. The apparatus of claim 1 wherein the dividing means comprises n−1 reflective planar surfaces each having an edge lying in the image plane.

* * * * *